April 1, 1941.　　　　T. O. HALL　　　　2,237,223
CLUTCH MECHANISM
Filed July 15, 1938
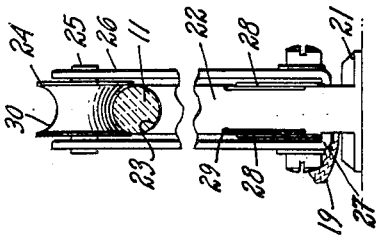
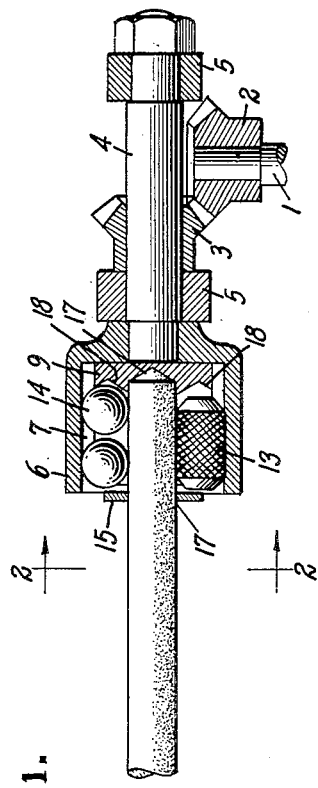
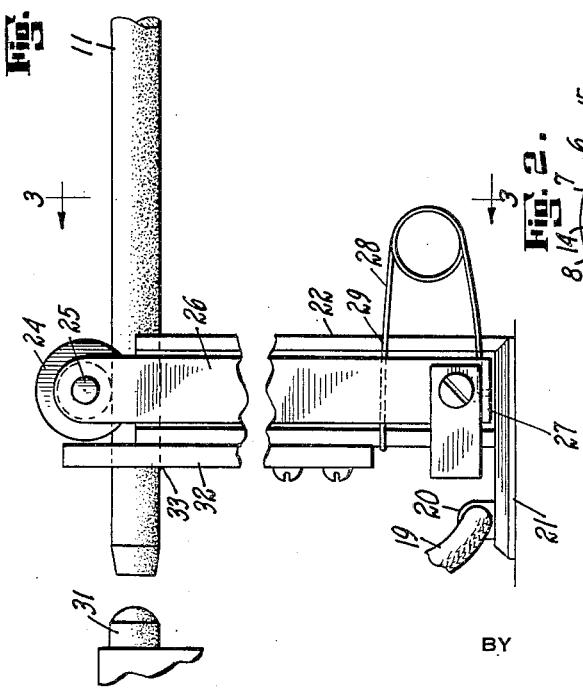
INVENTOR.
Theodore O. Hall
BY Hastings W. Baker
ATTORNEYS.

Patented Apr. 1, 1941

2,237,223

UNITED STATES PATENT OFFICE 2,237,223

CLUTCH MECHANISM

Theodore O. Hall, Sunnyside, N. Y., assignor, by mesne assignments, to J. E. McAuley Mfg. Co., Chicago, Ill., a corporation of Delaware Application July 15, 1938, Serial No. 219,334

7 Claims. (Cl. 176—119)

The object of this invention is to provide an improved clutch mechanism so that the article clutched may be readily engaged or disengaged therefrom.

The invention is particularly useful in connection with carbon feeding means in electric arc lamps in which the carbon is fed forward while being rotated. I have provided an improved clutch mechanism which may be rotated by a shaft and which clutch mechanism receives the positive carbon. When the carbon is consumed it is, of course, necessary to remove the carbon from the holder which is rotated by the driving shaft and which receives the carbon. Heretofore this carbon has been held in the holder by various means such as a set screw. I have provided a positively actuated clutch which is driven by the rotary drive shaft and I have provided means whereby the clutch will automatically take hold of the carbon and rotate it when the carbon is inserted and the rotary shaft is driven. When it is desired to remove the carbon, for instance, when the usable portion thereof has been consumed, the operator stops the rotary shaft and by simply rotating the carbon slightly reversely the clutch mechanism is released so that the carbon is free to be removed by the operator.

Another object of the invention is to provide yieldable holding means serving as a brake to yieldingly oppose the rotation of the carbon and thereby render the clutching mechanism effective.

Another object of the invention is to provide a shielding means for the electrical connections leading to the rotatable carbon so the said connections will be shielded from the intense heat of the arc.

Other objects and advantages will appear in the detailed specification and claims which follow.

The invention may be better understood by referring to the attached drawing forming a part hereof in which, Fig. 1 is a side elevational view partly in cross section and Fig. 2 is a cross-sectional view on the line 2—2 of Fig. 1 looking in the direction of the arrows, certain of the parts being broken away so as to disclose the internal construction of the clutch, and Fig. 3 is a view of the stationary holding means taken on the line 3—3 of Fig. 1 looking in the direction of the arrows.

The shaft 1 is rotated by a mechanism which is well known in the art and which is not shown on the drawing but which mechanism includes means not only to rotate the shaft 1 but to move it to the right as viewed in Fig. 1 so that the distance between the positive and negative carbons is maintained substantially constant. Such a type of mechanism in which the carbon is rotated and is fed forwardly to maintain a constant arc gap is shown in the patent to Hall 1,991,744. On the shaft 1 is a bevel gear 2 which meshes with and drives a bevel gear 3 on the clutch driving shaft 4 mounted in bearings 5, which bearings are moved with the shaft 1 in the above described movement to maintain the constant spacing between the carbons. Secured to the clutch driving shaft 4 is a clutch housing 6 which is substantially circular on the outside but on the inside forms a barrel 7 which is, as shown in Fig. 2, slightly eccentric forming the eccentric surface 8. A head roller assembly 9 is mounted in the clutch housing 6 and is freely rotatable therein. The head roller assembly 9 is inserted in the barrel 7 and this head roller assembly is provided with a central circular aperture 10 adapted to receive the positive carbon 11. The head roller assembly is also provided with two longitudinally extending channels 12 which channels are arcuate in cross section and intersect the circle forming the periphery of the central aperture 10 so that rollers 13 or balls 14 inserted in channels 12 can grip the carbon 11 by the rollers or balls extending slightly within the aperture 10 and gripping the carbon therein. A plate 15 is secured to the clutch housing by means of screws 16 and is provided with a central aperture 17 through which the positive carbon extends. The central aperture 10 terminates in a V-shaped portion 17 and the channels 12 end in V-shaped portions 18, the bottom of the V-shaped portions being on a line substantially coaxial with the axis of rotation of the rollers or balls.

The positive lead 19 extends to a terminal 20 on a stationary base 21 which is integral with a standard 22 which is provided at its upper end with a circular channel 23 on which rests the positive carbon 11. A roller 24 rides on the upper portion of the carbon and is preferably provided with a similar depression 30 between its sides so as in effect to straddle the carbon. This roller is mounted on a spindle 25 carried by arms 26 which at their lower end terminate in inwardly extending flanges 27. A spring 28 passes through slots 29 in the standard 22 and its other end presses against the said flange 27 so that the roller 24 is yieldingly pressed downwardly on the carbon. The positive carbon projects beyond the standard 22 as is clearly shown in Fig. 1 and into a position such that the left hand end of the positive carbon as viewed in Fig. 1 is the proper distance from the negative carbon 31. As the carbon 11 is consumed the shaft 1, as previously explained, is moved by mechanism, not shown, to the left so as to maintain the gap between the said carbons substantially uniform. Interposed between the standard 22 and the left hand end of the positive carbon as viewed in Fig. 1 is a shield 32 which is provided with a central aperture 33 through which the carbon passes, thereby effectively shielding the standard 22 and the parts carried thereby from the flame of the arc light.

It will be understood that the current from the lead 19 will pass through the terminal 20 and upwardly through the standard 22 to the carbon which contacts the said standard.

When a new carbon is to be inserted, the operator would move the clutch housing and parts associated therewith to the right of the position shown in Fig. 1 and would then insert the carbon between the roller 24 and the standard 22, the spring 28 yielding sufficiently to permit the introduction thereof. The clutch housing would then be moved into the position shown in Fig. 1 by the operator and the mechanism to rotate the shaft 1 would be started. The carbon 11 would tend to remain stationary on account of the friction between it and the standard 22 and roller 24. This would cause the balls or rollers to lag behind the rotation of the housing 6 so that they would be engaged by the eccentric surface 8 and would be pressed into engagement with the carbon, thereby effectively clutching the carbon to the holder which is rotated by the shaft 4. When it is desired to remove the carbon after the usable portion thereof has been consumed, the clutch is effectively rendered inoperative simply by rotating the carbon 11 reversely to the direction in which it has been rotated by the shaft 4 so as to bring the rollers or balls into a position where they would not be engaged by the eccentric surface 8 of the housing. The carbon may now be slipped out of the clutching mechanism and a new one inserted.

For the purpose of illustration I have shown a roller 13 provided with a knurled surface and have shown two balls 14. I found, however, that the mechanism is entirely satisfactory if two rollers are used, one of which would displace the two balls 14 and it would also be effective if four balls were used, two of which balls would displace the knurled roller 13.

I realize that many changes may be made in the specific form of the invention shown by way of illustration in this application, and I therefore reserve the right to make all changes which may fairly fall within the scope of the appended claims.

Having now described my invention, I claim:

1. In a carbon rotating mechanism, a rotatable shaft, a clutch housing carried by said shaft, said clutch housing having an eccentric inner surface, means to hold a carbon concentric with said housing, and rotatable members interposed between said eccentric inner surface and the carbon and a brake serving as a means to cause the rotatable members to grip the eccentric inner surface of the housing and the carbon.

2. In a carbon rotating mechanism, a rotatable shaft, a clutch housing carried by said shaft, said clutch housing having an eccentric inner surface, means to hold a carbon concentric with said housing, rotatable members interposed between said eccentric inner surface and the carbon, and a spring controlled brake tending to cause a lag between the rotation of the carbon and the housing so as to cause the rotatable members to grip the housing and carbon.

3. In a carbon rotating mechanism, a rotatable shaft, a clutch housing carried by said shaft, said clutch housing having an eccentric inner surface, a roller assembly mounted within said housing and provided with a central aperture adapted to receive a carbon, rotatable members interposed between said eccentric inner surface and the carbon and a brake serving as a means to cause the rotatable members to grip the eccentric inner surface of the housing and the carbon.

4. In a carbon rotating mechanism, a rotatable shaft, a clutch housing carried by said shaft, said clutch housing having an eccentric inner surface, a roller assembly mounted within said housing and provided with a central aperture adapted to receive a carbon and provided with two arcuate channels, rotatable members positioned in said channels and between said eccentric surface and the carbon and a brake serving as a means to cause the rotatable members to grip the eccentric inner surface of the housing and the carbon.

5. In a carbon rotating mechanism, a rotatable shaft, a clutch housing carried by said shaft, said clutch housing having an eccentric inner surface, a roller assembly mounted within said housing and provided with a central aperture adapted to receive a carbon and provided with two arcuate channels, rotatable members positioned in said channels and between said eccentric surface and the carbon, means to hold said rotatable members in said channels and a brake serving as a means to cause the rotatable members to grip the eccentric inner surface of the housing and the carbon.

6. In a carbon rotating mechanism, a rotatable shaft, a clutch housing carried by said shaft, said clutch housing having an eccentric inner surface, a roller assembly mounted within said housing and provided with a central aperture adapted to receive a carbon and provided with two arcuate channels, rotatable members positioned in said channels and between said eccentric surface and the carbon, means to hold said rotatable members in said channels and a brake tending to resist the rotation of said carbon so as to cause the rotatable members to grip the housing and carbon.

7. In a carbon rotating mechanism, a rotatable shaft, a clutch housing carried by said shaft, said clutch housing having an eccentric inner surface, a roller assembly mounted within said housing and provided with a central aperture adapted to receive a carbon and provided with two arcuate channels, rotatable members positioned in said channels and between said eccentric surface and the carbon, means to hold said rotatable members in said channels and a brake tending to resist the rotation of said carbon so as to cause the rotatable members to grip the housing and carbon, said brake consisting of a stationary standard provided with an arcuate surface against which the carbon lies and means to resiliently press the carbon against said surface.

THEODORE O. HALL.